(12) United States Patent
Maruyama (10) Patent No.: US 11,296,533 B2
(45) Date of Patent: Apr. 5, 2022

(54) VEHICLE POWER SUPPLY DEVICE

(71) Applicant: Yazaki Corporation, Tokyo (JP)

(72) Inventor: Akinori Maruyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 343 days.

(21) Appl. No.: 16/537,473

(22) Filed: Aug. 9, 2019

(65) Prior Publication Data

US 2020/0091753 A1 Mar. 19, 2020

(30) Foreign Application Priority Data

Sep. 13, 2018 (JP) .............................. JP2018-171465

(51) Int. Cl.

| | | |
|---|---|---|
| *H02J 7/02* | (2016.01) | |
| *B60R 16/033* | (2006.01) | |
| *B60L 53/24* | (2019.01) | |
| *H02M 3/00* | (2006.01) | |
| *H02J 7/00* | (2006.01) | |
| *H02M 7/217* | (2006.01) | |
| *H02J 7/34* | (2006.01) | |

(52) U.S. Cl.
CPC .............. *H02J 7/022* (2013.01); *B60L 53/24* (2019.02); *B60R 16/033* (2013.01); *H02J 7/0063* (2013.01); *H02J 7/0068* (2013.01); *H02J 7/342* (2020.01); *H02M 3/00* (2013.01); *H02M 7/217* (2013.01); *B60L 2210/10* (2013.01); *B60L 2210/30* (2013.01); *H02J 2207/10* (2020.01)

(58) Field of Classification Search
CPC .. H02J 7/02; H02J 7/022; H02J 7/0068; H02J 7/0054; H02J 7/0063; H02J 7/342; H02J 2007/0095; H02J 2207/10; B60R 16/033; B60L 53/24; B60L 2210/10; B60L 2210/30; H02M 3/00; H02M 7/217
USPC ............................................................ 320/107
See application file for complete search history.

(56) References Cited

U.S. PATENT DOCUMENTS

| | | | |
|---|---|---|---|
| 2012/0038214 A1* | 2/2012 | King ..................... | B60L 50/62 307/77 |
| 2012/0104861 A1* | 5/2012 | Kojori ..................... | H02J 7/00 307/82 |
| 2015/0042159 A1* | 2/2015 | Kim ...................... | B60L 1/003 307/10.1 |
| 2016/0036256 A1* | 2/2016 | Sukup .................... | H02J 7/0042 320/107 |
| 2017/0028857 A1* | 2/2017 | Gonzales ................ | B60L 53/50 |
| 2018/0069425 A1* | 3/2018 | Mastrandrea ........ | H01M 10/425 |
| 2018/0086217 A1* | 3/2018 | Scherdin ................ | B60L 53/65 |
| 2018/0138730 A1* | 5/2018 | Fuchs ................... | H02J 7/0027 |

FOREIGN PATENT DOCUMENTS

JP 2017-41999 A 2/2017

* cited by examiner

*Primary Examiner* — Richard Isla
*Assistant Examiner* — Dung V Bui
(74) *Attorney, Agent, or Firm* — Kenealy Vaidya LLP (57) ABSTRACT

A bidirectional two-phase chopper circuit boosts a voltage of direct-current power converted by an AC/DC converter to output it to a high-voltage battery and steps down a voltage of direct-current power being supplied to a low-voltage load unit from the high-voltage battery. A connector is connected to a quick charger supplying direct-current power. A connector is connected to a superquick charger supplying direct-current power having a higher voltage than that of the quick charger.

5 Claims, 7 Drawing Sheets

VEHICLE POWER SUPPLY DEVICE

CROSS-REFERENCE TO RELATED APPLICATION(S)

The present application claims priority to and incorporates by reference the entire contents of Japanese Patent Application No. 2018-171465 filed in Japan on Sep. 13, 2018.

BACKGROUND OF THE INVENTION

1. Field of the Invention

The present invention relates to a vehicle power supply device.

2. Description of the Related Art

Japanese Patent Application Laid-open No. 2017-41999 discloses, as a conventional vehicle power supply device, for example, a vehicle power supply system including a traveling battery, a standard battery having a lower voltage than that of the traveling battery, and a step-down converter stepping down a voltage of electric power supplied from the traveling battery and outputting it to the standard battery.

In the above-mentioned vehicle power supply system disclosed in Japanese Patent Application Laid-open No. 2017-41999, for example, a charging voltage of the traveling battery is desired to be increased in order to shorten charging time. In this case, however, a high-voltage converter is required and the device tends to increase in size.

SUMMARY OF THE INVENTION

The present invention has been made in view of the above-mentioned circumstances and an object thereof is to provide a vehicle power supply device capable of substantially preventing the device from being increased in size.

In order to achieve the above mentioned object, a vehicle power supply device according to one aspect of the present invention includes a battery that supplies direct-current power to a high-voltage load unit and a low-voltage load unit having a lower voltage than a voltage of the high-voltage load unit; an alternating-current power supply connector that is connected to an alternating-current power supply unit supplying alternating-current power to the battery; an AC/DC converter that converts, into direct-current power, the alternating-current power being supplied to the battery from the alternating-current power supply unit; a bidirectional DC/DC converter that boosts a voltage of the direct-current power converted by the AC/DC converter to output the direct-current power to the battery and steps down a voltage of the direct-current power being supplied to the low-voltage load unit from the battery; a first direct-current power supply connector that is connected to a first direct-current power supply unit supplying direct-current power; a second direct-current power supply connector that is connected to a second direct-current power supply unit supplying direct-current power having a higher voltage than a voltage of the first direct-current power supply unit; and a controller that controls the AC/DC converter and the bidirectional DC/DC converter, wherein when the alternating-current power is supplied from the alternating-current power supply unit, the controller charges the battery with direct-current power converted by the AC/DC converter and boosted by the bidirectional DC/DC converter and supplies, to the low-voltage load unit, the direct-current power converted by the AC/DC converter, when the direct-current power is supplied from the first direct-current power supply unit, the controller charges the battery with direct-current power boosted by the bidirectional DC/DC converter and supplies, to the low-voltage load unit, the direct-current power from the first direct-current power supply unit without passing through the bidirectional DC/DC converter, when the direct-current power is supplied from the second direct-current power supply unit, the controller charges the battery with the direct-current power from the second direct-current power supply unit without passing through the bidirectional DC/DC converter and supplies, to the low-voltage load unit, direct-current power of the battery that has been stepped down by the bidirectional DC/DC converter, and when no electric power is supplied from the alternating-current power supply unit, the first direct-current power supply unit, and the second direct-current power supply unit, the controller is capable of supplying the direct-current power to the high-voltage load unit from the battery without passing through the bidirectional DC/DC converter and supplies, to the low-voltage load unit, the direct-current power of the battery that has been stepped down by the bidirectional DC/DC converter.

According to another aspect of the present invention, in the vehicle power supply device, it is possible to configure that the AC/DC converter includes a rectifying circuit rectifying the alternating-current power supplied from the alternating-current power supply unit into direct-current power and an insulating-type DC/DC converter boosting a voltage of the direct-current power rectified by the rectifying circuit.

According to still another aspect of the present invention, in the vehicle power supply device, it is possible to configure that the bidirectional DC/DC converter includes a chopper circuit having a switching element allowing conduction of a current or blocking the current and a coil outputting an induction current in accordance with an operation of the switching element.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A mode for carrying out the present invention (embodiment) will be described in detail with reference to the drawings. Contents that are described in the following embodiment do not limit the present invention. Components to be described below include components that those skilled in the art can easily suppose and that are substantially the same components. Furthermore, configurations to be described below can be appropriately combined. Various omissions, replacements, or changes of the configurations can be made in a range without departing from the gist of the present invention.

EMBODIMENT

Figure 1:
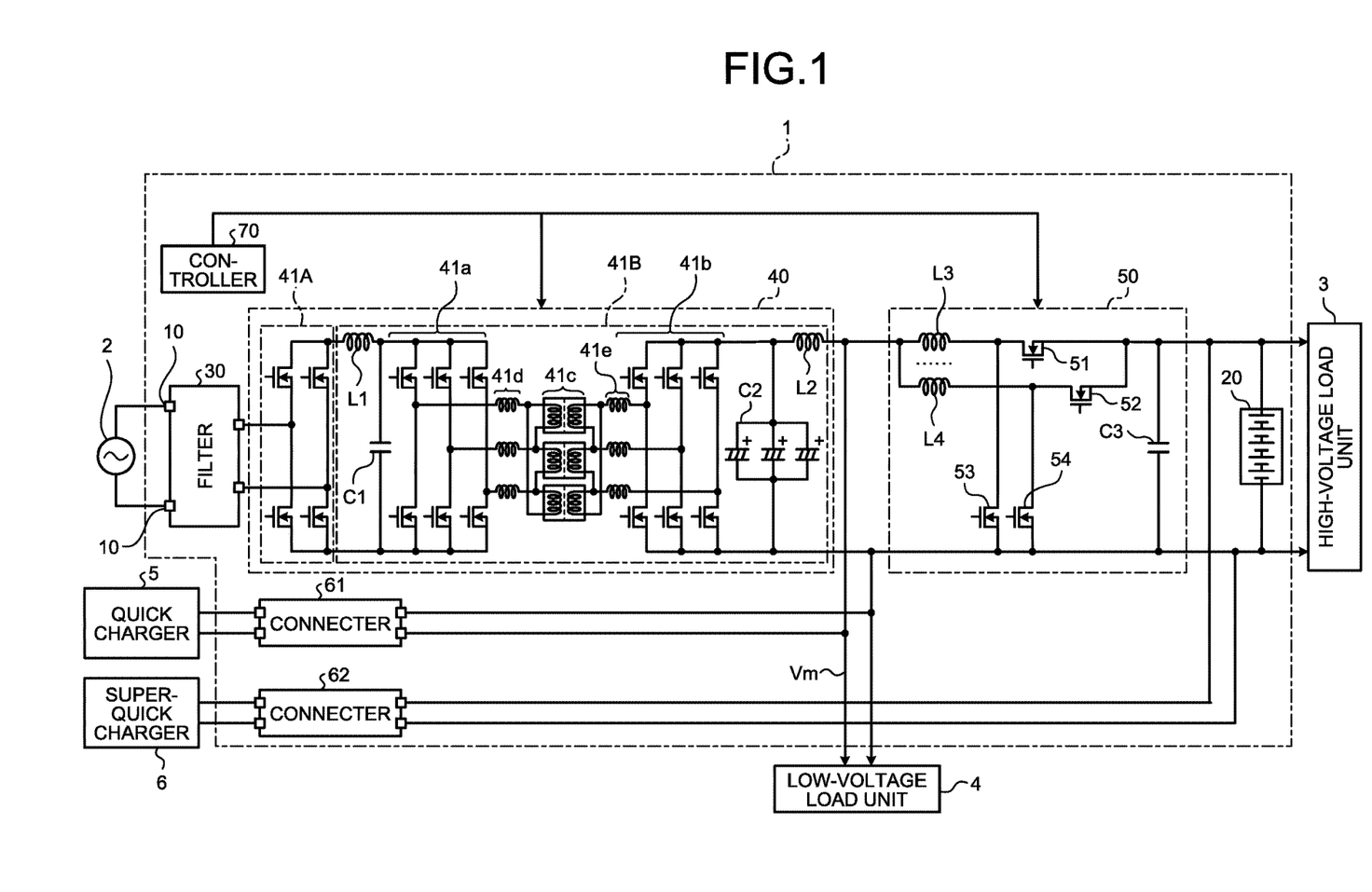
FIG. 1 is a block diagram illustrating an example of the configuration of a vehicle power supply device according to an embodiment.
Figure 2:
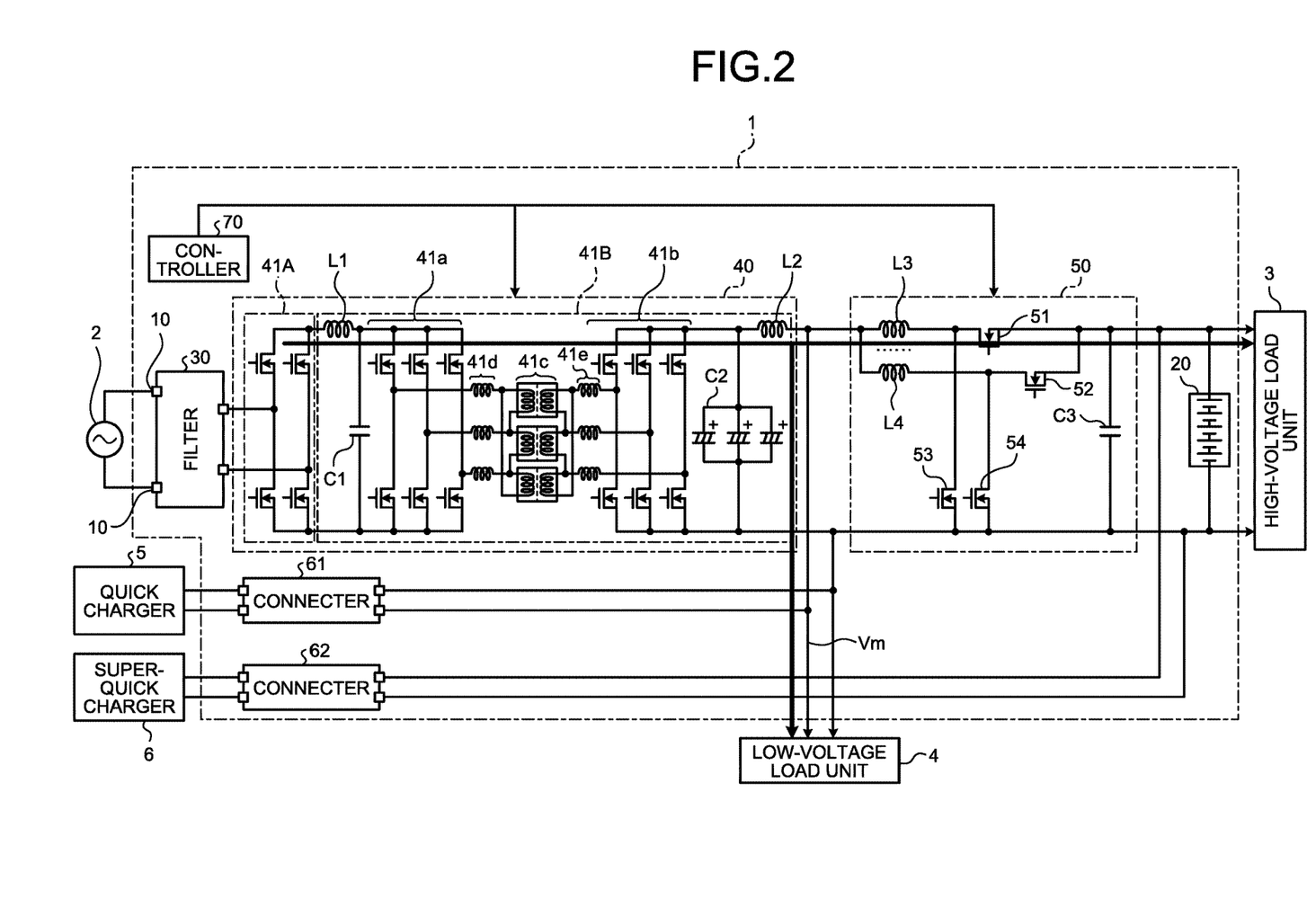
FIG. 2 is a block diagram illustrating an example of charging by an alternating-current power supply of the vehicle power supply device in the embodiment.
Figure 3:
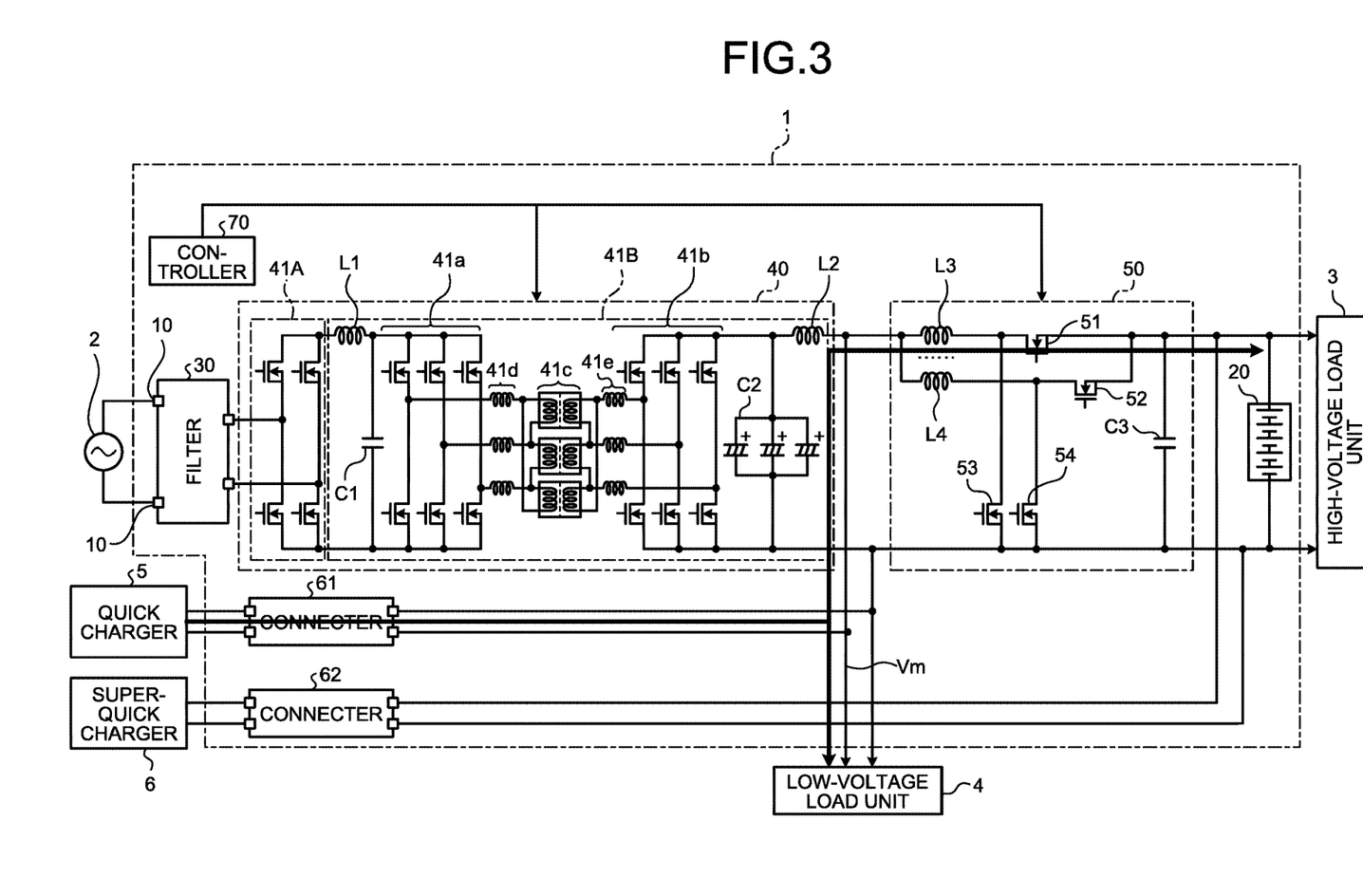
FIG. 3 is a block diagram illustrating an example of charging by a quick charger of the vehicle power supply device in the embodiment.
Figure 4:
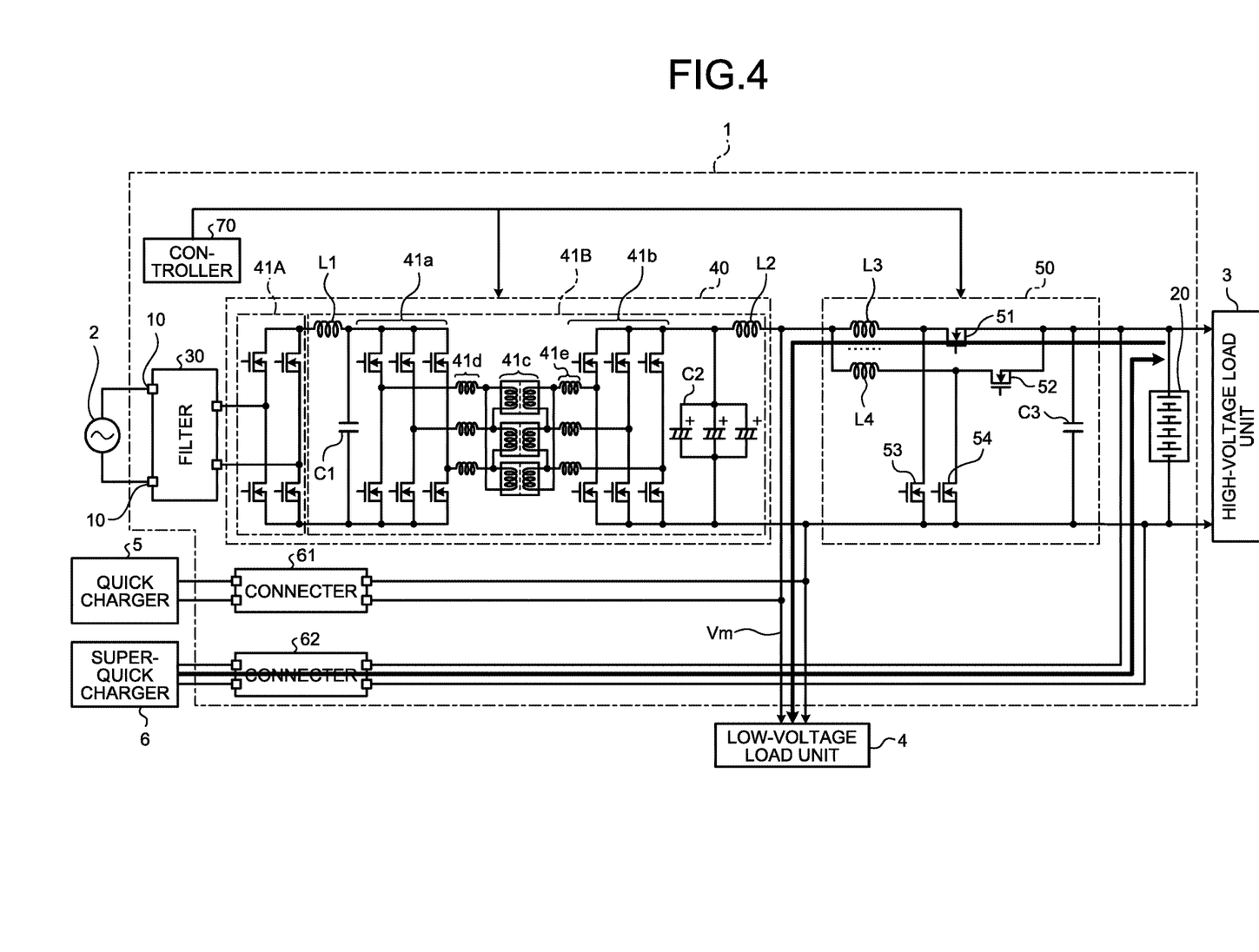
FIG. 4 is a block diagram illustrating an example of charging by a superquick charger of the vehicle power supply device in the embodiment.
Figure 5:
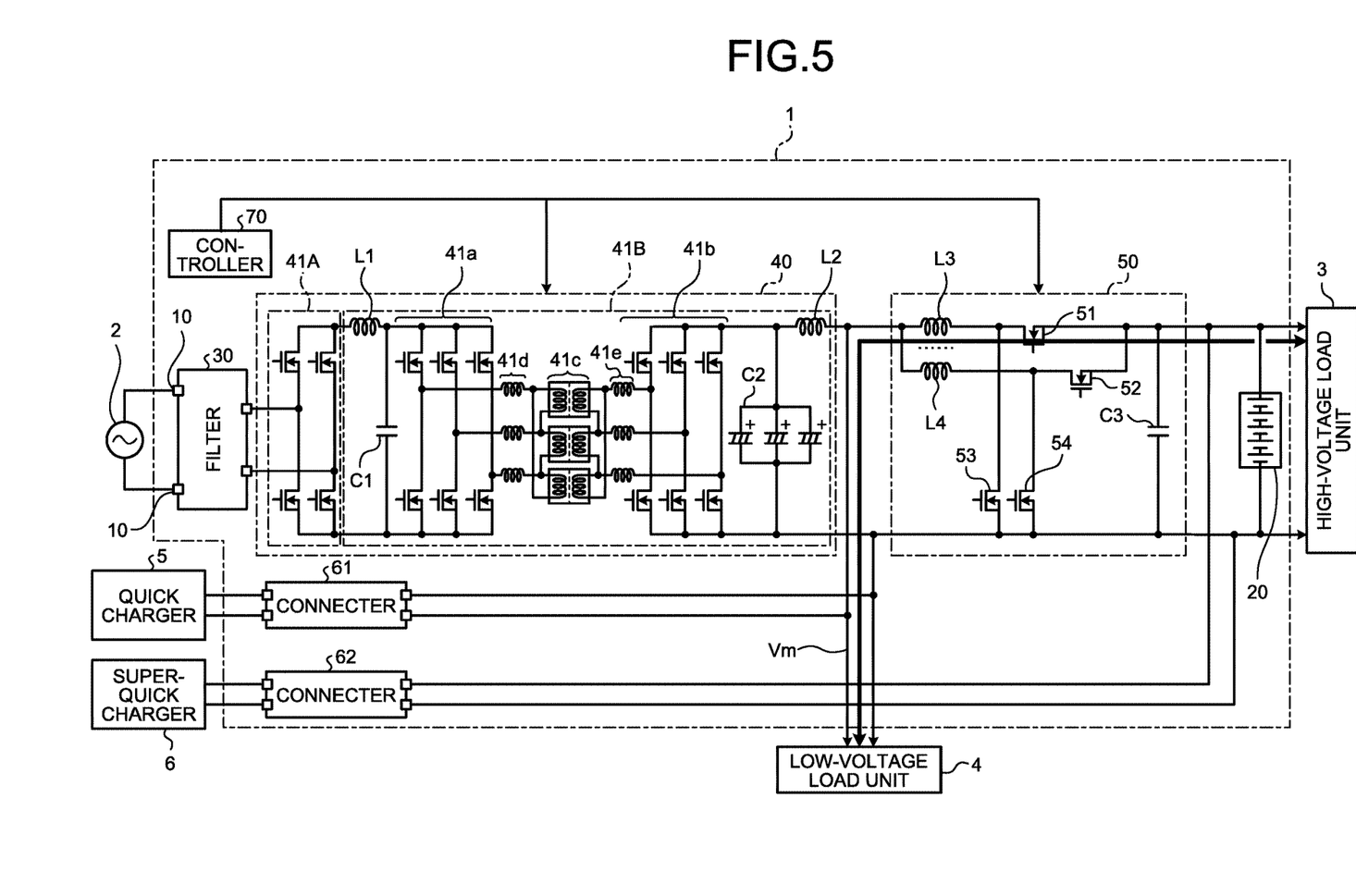
FIG. 5 is a block diagram illustrating an example of discharging of the vehicle power supply device in the embodiment.

A vehicle power supply device 1 according to an embodiment will be described with reference to the drawings. FIG. 1 is a block diagram illustrating an example of the configuration of the vehicle power supply device 1 in the embodiment. FIG. 2 is a block diagram illustrating an example of charging by an alternating-current power supply 2 of the vehicle power supply device 1 in the embodiment. FIG. 3 is a block diagram illustrating an example of charging by a quick charger 5 of the vehicle power supply device 1 in the embodiment. FIG. 4 is a block diagram illustrating an example of charging by a superquick charger 6 of the vehicle power supply device 1 in the embodiment. FIG. 5 is a block diagram illustrating an example of discharging of the vehicle power supply device 1 in the embodiment.

The vehicle power supply device 1 is mounted on, for example, a vehicle such as an electric vehicle (EV) and a plug-in hybrid vehicle (PHV) and supplies electric power to a high-voltage load unit 3 including an inverter and a motor generator and a low-voltage load unit 4 including an electric air conditioner that has a lower voltage than that of the high-voltage load unit 3.

As illustrated in FIG. 1, the vehicle power supply device 1 includes an AC inlet 10 as a power supply connector, a high-voltage battery 20 as a battery, a filter 30, an AC/DC converter 40, a bidirectional two-phase chopper circuit 50 as a bidirectional DC/DC converter, a connector 61 as a first direct-current power supply connector, a connector 62 as a second direct-current power supply connector, and a controller 70.

The AC inlet 10 is a connector that is connected to an AC outlet of an AC power supply (alternating-current power supply unit) 2 for domestic use. A part of the AC inlet 10 is exposed to the outside of the vehicle. The AC inlet 10 is connected to the AC outlet for domestic use and alternating-current power is output thereto from the AC power supply 2.

The high-voltage battery 20 supplies high-voltage direct-current power. The high-voltage battery 20 has a voltage of, for example, approximately 800 V to 1000 V and supplies relatively high-voltage direct-current power. The high-voltage battery 20 is connected to the AC power supply 2 with the AC/DC converter 40 and the bidirectional two-phase chopper circuit 50 interposed therebetween and is charged with electric power supplied from the AC power supply 2. The high-voltage battery 20 is connected to the connector 61 and is charged with electric power supplied from the quick charger 5 through the connector 61. The high-voltage battery 20 is connected to the connector 62 and is charged with electric power supplied from the superquick charger 6 through the connector 62. The high-voltage battery 20 is connected to the low-voltage load unit 4 with the bidirectional two-phase chopper circuit 50 interposed therebetween and supplies electric power to the low-voltage load unit 4. The high-voltage battery 20 is connected to the high-voltage load unit 3 and supplies electric power to the high-voltage load unit 3. An inverter of the high-voltage load unit 3 converts the direct-current power supplied from the high-voltage battery 20 into alternating-current power and supplies the alternating-current power to a motor generator. The motor generator is driven with the alternating-current power supplied from the inverter to rotate a wheel of the vehicle.

The filter 30 reduces noise. The filter 30 is connected to the AC inlet 10 and reduces noise of the alternating-current power output from the AC inlet 10. The filter 30 is connected to the AC/DC converter 40 and outputs the alternating-current power with the reduced noise to the AC/DC converter 40.

The AC/DC converter 40 converts alternating-current power into direct-current power. The AC/DC converter 40 is an insulating-type power factor correction (PFC) circuit improving a power factor and includes a rectifying circuit 41A and a DC/DC converter 41B. The rectifying circuit 41A rectifies alternating-current power into direct-current power. The rectifying circuit 41A is, for example, a full-bridge circuit having four switching elements. The rectifying circuit 41A is connected to the filter 30 and rectifies the alternating-current power output from the filter 30 into direct-current power. The rectifying circuit 41A is connected to the DC/DC converter 41B and outputs the rectified direct-current power to the DC/DC converter 41B.

The DC/DC converter 41B boosts a voltage. The DC/DC converter 41B is, for example, a one-converter circuit using a three-phase dual active bridge (DAB). The DC/DC converter 41B includes a first bridge circuit 41a, a second bridge circuit 41b, a transformer 41c, capacitors C1 and C2, coil portions 41d and 41e, and coils L1 and L2.

The first bridge circuit 41a is a three-phase full-bridge circuit having six switching elements. The first bridge circuit 41a is connected to the rectifying circuit 41A and the transformer 41c. The first bridge circuit 41a converts the direct-current power output from the rectifying circuit 41A into alternating-current power and outputs the alternating-current power to the transformer 41c.

The second bridge circuit 41b is a three-phase full-bridge circuit having six switching elements. The second bridge circuit 41b is connected to the transformer 41c and converts alternating-current power output from the transformer 41c into direct-current power. The second bridge circuit 41b is connected to the bidirectional two-phase chopper circuit 50 and the low-voltage load unit 4 and outputs the converted direct-current power to the bidirectional two-phase chopper circuit 50 and the low-voltage load unit 4.

The transformer 41c includes a primary winding portion having three coils and a secondary winding portion having three coils and being magnetically coupled to the primary winding portion. The primary winding portion and the secondary winding portion are insulated from each other. The transformer 41c can thereby insulate the AC inlet 10 and a high-voltage power supply system including the quick charger 5, the high-voltage load unit 3 such as the motor generator, and the high-voltage battery 20. Thus, the vehicle power supply device 1 connects the high-voltage power supply system and the AC inlet 10 with the AC/DC converter 40 interposed therebetween, so that the high-voltage power supply system can be easily isolated, thereby improving maintainability.

The primary winding portion of the transformer 41c is connected to the first bridge circuit 41a with the coil portion 41d interposed therebetween. The secondary winding portion of the transformer 41c is connected to the second bridge circuit 41b with the coil portion 41e interposed therebetween. The transformer 41c converts a voltage by electromagnetic induction of the primary winding portion and the secondary winding portion. The transformer 41c boosts a voltage of electric power supplied from the AC power supply 2.

The capacitor C1 is provided between the first bridge circuit 41a and the rectifying circuit 41A and smoothes the direct-current power that is output from the rectifying circuit 41A to the first bridge circuit 41a. The capacitor C2 is provided between the second bridge circuit 41b and the bidirectional two-phase chopper circuit 50 and smoothes the direct-current power that is output from the second bridge circuit 41b to the bidirectional two-phase chopper circuit 50. The first bridge circuit 41a and the rectifying circuit 41A are connected to each other with the coil L1 interposed therebetween, and the second bridge circuit 41b and the bidirectional two-phase chopper circuit 50 are connected to each other with the coil L2 interposed therebetween.

The bidirectional two-phase chopper circuit 50 boosts or steps down a voltage. The bidirectional two-phase chopper circuit 50 is connected to the AC/DC converter 40, the connector 61, the high-voltage battery 20, and the low-voltage load unit 4. The bidirectional two-phase chopper circuit 50 includes switching elements 51 to 54 allowing conduction of a current or blocking the current, coupling inductors (coils) L3 and L4 outputting induction currents in accordance with operations of the switching elements 51 to 54, and a smoothing capacitor C3. The bidirectional two-phase chopper circuit 50 turns ON/OFF the switching elements 51 to 54, boosts a voltage of the direct-current power output from the AC/DC converter 40, and outputs it to the high-voltage battery 20. The bidirectional two-phase chopper circuit 50, for example, doubles the voltage of the direct-current power output from the AC/DC converter 40. The bidirectional two-phase chopper circuit 50 turns ON/OFF the switching elements 51 to 54, steps down a voltage of direct-current power output from the high-voltage battery 20, and outputs it to the low-voltage load unit 4. The bidirectional two-phase chopper circuit 50, for example, steps down, by half, the voltage of the direct-current power output from the high-voltage battery 20. The capacitor C3 is connected to the bidirectional two-phase chopper circuit 50 and smoothes the direct-current power output from the bidirectional two-phase chopper circuit 50. The smoothing capacitor C3 is connected to the high-voltage battery 20 and outputs the smoothed direct-current power to the high-voltage battery 20.

The connector 61 is a connector connected to the quick charger 5 supplying direct-current power. The quick charger 5 supplies direct-current power of a voltage of, for example, approximately 400 V to 500 V. The connector 61 is connected to the bidirectional two-phase chopper circuit 50 and outputs the direct-current power supplied from the quick charger 5 to the bidirectional two-phase chopper circuit 50. The connector 61 is connected to the low-voltage load unit 4 and outputs the direct-current power supplied from the quick charger 5 to the low-voltage load unit 4.

The connector 62 is a connector connected to the superquick charger 6 supplying direct-current power. The superquick charger 6 supplies direct-current power of a higher voltage than that of the quick charger 5 and supplies direct-current power of a voltage of, for example, approximately 800 V to 1000 V. The connector 62 is connected to the high-voltage battery 20 and outputs the direct-current power supplied from the superquick charger 6 directly to the high-voltage battery 20.

The controller 70 controls the AC/DC converter 40 and the bidirectional two-phase chopper circuit 50. The controller 70 includes an electronic circuit configured by, as a main body, a well-known micro computer including a central processing unit (CPU), a read only memory (ROM) configuring a storage unit, a random access memory (RAM), and an interface. The controller 70 monitors connection states to the power supply units. The controller 70 monitors, for example, a connection state between the AC power supply 2 and the AC inlet 10, a connection state between the quick charger 5 and the connector 61, and a connection state between the superquick charger 6 and the connector 62.

When the AC power supply 2 and the AC inlet 10 are connected to each other and the alternating-current power is supplied from the AC power supply 2, as illustrated in FIG. 2, the controller 70 charges the high-voltage battery 20 with the direct-current power converted by the AC/DC converter 40 and boosted by the bidirectional two-phase chopper circuit 50. Furthermore, the controller 70 supplies, to the low-voltage load unit 4, the direct-current power converted by the AC/DC converter 40.

When the quick charger 5 and the connector 61 are connected to each other and the direct-current power is supplied from the quick charger 5, as illustrated in FIG. 3, the controller 70 charges the high-voltage battery 20 with the direct-current power boosted by the bidirectional two-phase chopper circuit 50. Furthermore, the controller 70 supplies the direct-current power to the low-voltage load unit 4 from the quick charger 5 without passing through the bidirectional two-phase chopper circuit 50.

When the superquick charger 6 and the connector 62 are connected to each other and the direct-current power is supplied from the superquick charger 6, as illustrated in FIG. 4, the controller 70 charges the high-voltage battery 20 with the direct-current power from the superquick charger 6 without passing through the bidirectional two-phase chopper circuit 50. Furthermore, the controller 70 supplies, to the low-voltage load unit 4, the direct-current power of the high-voltage battery 20 that has been stepped down by the bidirectional two-phase chopper circuit 50.

When no electric power is supplied from the AC power supply 2, the quick charger 5, and the superquick charger 6, as illustrated in FIG. 5, the controller 70 supplies the direct-current power to the high-voltage load unit 3 from the high-voltage battery 20 without passing through the bidirectional two-phase chopper circuit 50 and supplies, to the low-voltage load unit 4, the direct-current power of the high-voltage battery 20 that has been stepped down by the bidirectional two-phase chopper circuit 50.

Next, an example of operations of the vehicle power supply device 1 will be described with reference to FIG. 6.

Figure 6:
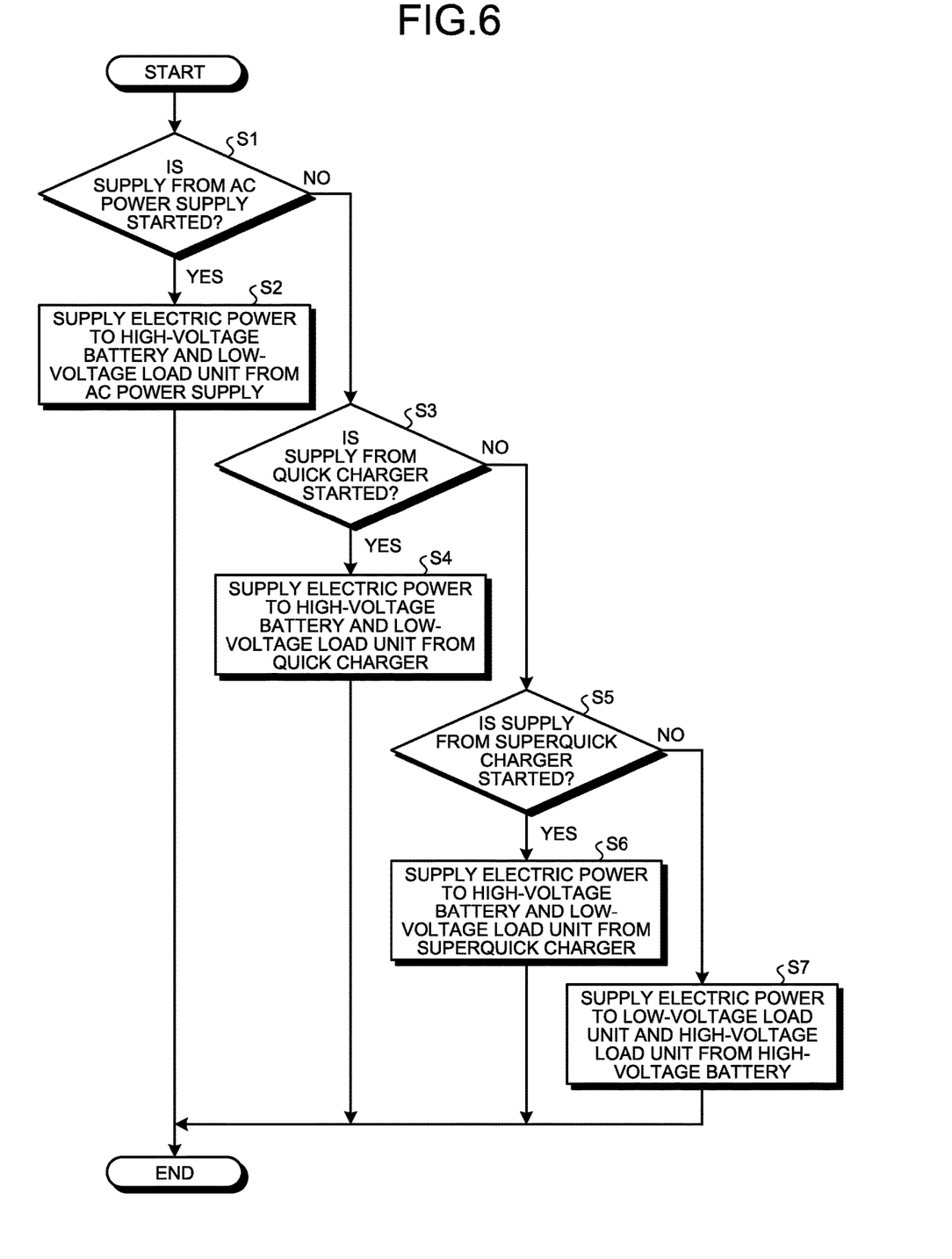
FIG. 6 is a flowchart illustrating an example of operations of the vehicle power supply device in the embodiment.

FIG. 6 is a flowchart illustrating the example of the operations of the vehicle power supply device 1 in the embodiment. The vehicle power supply device 1 determines, by the controller 70, whether supply of electric power from the AC power supply 2 is started (step S). When the supply of the electric power from the AC power supply 2 is started (Yes at step S1), the controller 70 supplies the electric power to the high-voltage battery 20 and the low-voltage load unit 4 from the AC power supply 2 (step S2). The controller 70, for example, charges the high-voltage battery 20 with direct-current power converted by the AC/DC converter 40 and boosted by the bidirectional two-phase chopper circuit 50. Furthermore, the controller 70 supplies, to the low-voltage load unit 4, direct-current power of an intermediate voltage Vm boosted by the AC/DC converter 40, and the processing ends. The intermediate voltage Vm is, for example, approximately 400 V to 500 V.

When the supply of the electric power from the AC power supply 2 is not started at the above-mentioned step S1 (No at step S1), the controller 70 determines whether supply of electric power from the quick charger 5 is started (step S3). When the supply of the electric power from the quick charger 5 is started (Yes at step S3), the controller 70 supplies the electric power to the high-voltage battery 20 and the low-voltage load unit 4 from the quick charger 5 (step S4). The controller 70, for example, charges the high-voltage battery 20 with direct-current power boosted by the bidirectional two-phase chopper circuit 50. Furthermore, the controller 70 supplies direct-current power of the intermediate voltage Vm to the low-voltage load unit 4 from the quick charger 5 without passing through the bidirectional two-phase chopper circuit 50, and the processing ends.

When the supply of the electric power from the quick charger 5 is not started at the above-mentioned step S3 (No at step S3), the controller 70 determines whether supply of electric power from the superquick charger 6 is started (step S5). When the supply of the electric power from the superquick charger 6 is started (Yes at step S5), the controller 70 supplies the electric power to the high-voltage battery 20 from the superquick charger 6 and supplies the electric power to the low-voltage load unit 4 from the high-voltage battery 20 (step S6). The controller 70, for example, charges the high-voltage battery 20 with direct-current power from the superquick charger 6 without passing through the bidirectional two-phase chopper circuit 50. Furthermore, the controller 70 supplies, to the low-voltage load unit 4, direct-current power of the intermediate voltage Vm of the high-voltage battery 20 that has been stepped down by the bidirectional two-phase chopper circuit 50, and the processing ends.

When the supply of the electric power from the superquick charger 6 is not started at the above-mentioned step S5 (No at step S5), the controller 70 supplies electric power to the low-voltage load unit 4 and the high-voltage load unit 3 from the high-voltage battery 20 (step S7). The controller 70, for example, supplies direct-current power to the high-voltage load unit 3 from the high-voltage battery 20 without passing through the bidirectional two-phase chopper circuit 50 and supplies, to the low-voltage load unit 4, direct-current power of the intermediate voltage Vm that has been stepped down by the bidirectional two-phase chopper circuit 50.

As described above, the vehicle power supply device 1 in the embodiment includes the high-voltage battery 20, the AC inlet 10, the AC/DC converter 40, the bidirectional two-phase chopper circuit 50, the connector 61, the connector 62, and the controller 70. The high-voltage battery 20 supplies the direct-current power to the high-voltage load unit 3 and the low-voltage load unit 4 having a lower voltage than that of the high-voltage load unit 3. The AC inlet 10 is connected to the AC power supply 2 supplying the alternating-current power to the high-voltage battery 20. The AC/DC converter 40 converts, into the direct-current power, the alternating-current power being supplied to the high-voltage battery 20 from the AC power supply 2. The bidirectional two-phase chopper circuit 50 boosts the voltage of the direct-current power converted by the AC/DC converter 40 to output it to the high-voltage battery 20 and steps down the voltage of the direct-current power being supplied to the low-voltage load unit 4 from the high-voltage battery 20. The connector 61 is connected to the quick charger 5 supplying the direct-current power. The connector 62 is connected to the superquick charger 6 supplying the direct-current power having a higher voltage than that of the quick charger 5. The controller 70 controls the AC/DC converter 40 and the bidirectional two-phase chopper circuit 50.

When the alternating-current power is supplied from the AC power supply 2, the controller 70 charges the high-voltage battery 20 with the direct-current power converted by the AC/DC converter 40 and boosted by the bidirectional two-phase chopper circuit 50 and supplies the direct-current power converted by the AC/DC converter 40 to the low-voltage load unit 4. When the direct-current power is supplied from the quick charger 5, the controller 70 charges the high-voltage battery 20 with the direct-current power boosted by the bidirectional two-phase chopper circuit 50 and supplies the direct-current power to the low-voltage load unit 4 from the quick charger 5 without passing through the bidirectional two-phase chopper circuit 50. When the direct-current power is supplied from the superquick charger 6, the controller 70 charges the high-voltage battery 20 with the direct-current power from the superquick charger 6 without passing through the bidirectional two-phase chopper circuit 50 and supplies, to the low-voltage load unit 4, the direct-current power of the high-voltage battery 20 that has been stepped down by the bidirectional two-phase chopper circuit 50. When no power is supplied from the AC power supply 2, the quick charger 5, and the superquick charger 6, the controller 70 is capable of supplying the direct-current power to the high-voltage load unit 3 from the high-voltage battery 20 without passing through the bidirectional two-phase chopper circuit 50 and supplies, to the low-voltage load unit 4, the direct-current power of the high-voltage battery 20 that has been stepped down by the bidirectional two-phase chopper circuit 50.

With this configuration, the vehicle power supply device 1 can charge the high-voltage battery 20 with the direct-current power from the AC power supply 2 by the AC/DC converter 40 and the bidirectional two-phase chopper circuit 50. The vehicle power supply device 1 can step down the direct-current power of the high-voltage battery 20 and supply it to the low-voltage load unit 4 by the bidirectional two-phase chopper circuit 50. The vehicle power supply device 1 can thereby use the bidirectional two-phase chopper circuit 50 as a boosting converter when charging the high-voltage battery 20 and a step-down converter when discharging the high-voltage battery 20. That is to say, the vehicle power supply device 1 can use the bidirectional two-phase chopper circuit 50 as the boosting converter in charging and the step-down converter in discharging. The vehicle power supply device 1 can thereby substantially prevent increase in the number of power converters, thereby substantially preventing the device from being increased in size. In addition, the vehicle power supply device 1 can reduce manufacturing cost.

The vehicle power supply device 1 can generate the intermediate voltage Vm when the high-voltage battery 20 is charged with electric power from any of the AC power supply 2, the quick charger 5, and the superquick charger 6 and supply the direct-current power of the intermediate voltage Vm to the low-voltage load unit 4. The vehicle power supply device 1 generates the intermediate voltage Vm also during charging of the high-voltage battery 20, thereby operating the low-voltage load unit 4 such as the electric air conditioner also during charging of the high-voltage battery 20. The vehicle power supply device 1 can decrease a creepage distance relatively by generating the intermediate voltage Vm, thereby substantially preventing the device from being increased in size. Since the vehicle power supply device 1 generates the intermediate voltage Vm, the low-voltage load unit 4, for example, does not need special specifications for high voltage, and manufacturing cost of the low-voltage load unit 4 can be reduced.

In the above-mentioned vehicle power supply device 1, the AC/DC converter 40 includes the rectifying circuit 41A rectifying the alternating-current power supplied from the AC power supply 2 into the direct-current power and the insulating-type DC/DC converter 41B boosting the voltage of the direct-current power rectified by the rectifying circuit 41A. The conventional vehicle power supply device, for example, uses a non-insulating-type PFC circuit and an insulating-type DC/DC converter. On the other hand, the vehicle power supply device 1 in the embodiment connects an output portion of the AC/DC converter 40 (PFC circuit) to the high-voltage power supply system such as the quick charger 5. Insulating performance between the AC inlet 10 and the high-voltage power supply system can therefore be ensured by insulating the AC/DC converter 40.

In the above-mentioned vehicle power supply device 1, the bidirectional two-phase chopper circuit 50 includes the chopper circuit having the switching elements 51 to 54 allowing conduction of a current or blocking the current and the coupling inductors L3 and L4 outputting the induction currents in accordance with the operations of the switching elements 51 to 54. With this configuration, the vehicle power supply device 1 can operate the bidirectional two-phase chopper circuit 50 with magnification maximizing effects of the coupling inductors L3 and L4 by adjusting the intermediate voltage Vm by the AC/DC converter 40. The vehicle power supply device 1 can thereby reduce cores of the coupling inductors L3 and L4 and the smoothing capacitor C3 in size, thereby substantially preventing the device from being increased in size.

Modification

Figure 7:
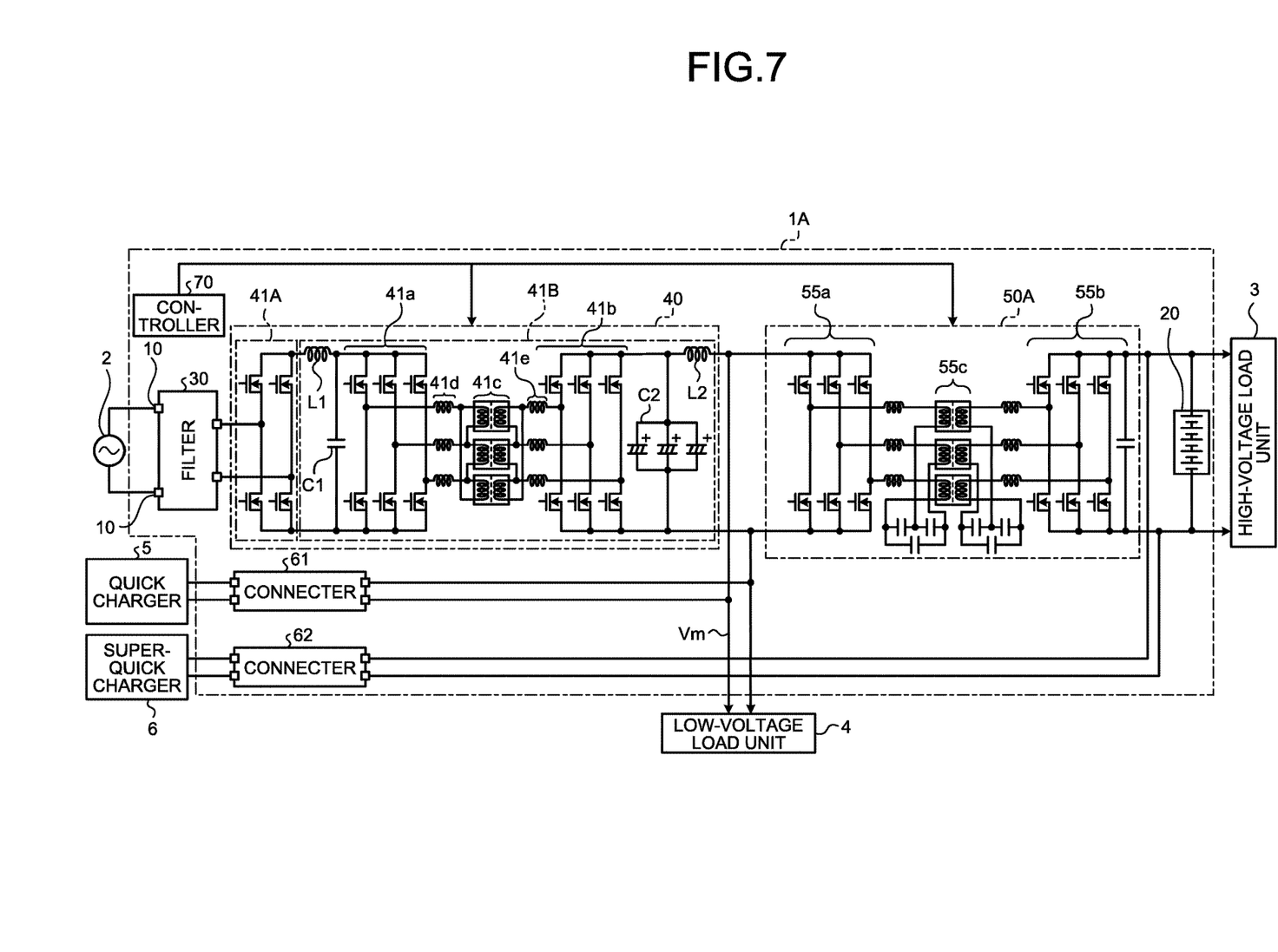
FIG. 7 is a block diagram illustrating an example of the configuration of a vehicle power supply device according to a modification of the embodiment.

Next, a modification of the embodiment will be described. FIG. 7 is a block diagram illustrating an example of the configuration of a vehicle power supply device 1A according to the modification of the embodiment. The vehicle power supply device 1A in the modification differs from the vehicle power supply device 1 in the embodiment in the point that it uses an insulating-type bidirectional DC/DC converter 50A instead of the bidirectional two-phase chopper circuit 50 of the vehicle power supply device 1. As illustrated in FIG. 7, the bidirectional DC/DC converter 50A includes a first bridge circuit 55a, a second bridge circuit 55b, and a transformer 55c. The bidirectional DC/DC converter 50A can insulate a high-voltage power supply system including the high-voltage load unit 3 and the high-voltage battery 20 and the intermediate voltage Vm.

Although in the above description, when electric power is supplied from the high-voltage battery 20, the controller 70 supplies the electric power to the high-voltage load unit 3 and the low-voltage load unit 4, as an example, the controller 70 is not limited thereto. When the electric power is supplied from the high-voltage battery 20, the controller 70 may supply the electric power to the low-voltage load unit 4 only without supplying it to the high-voltage load unit 3.

Although the AC/DC converter 40 includes the rectifying circuit 41A and the insulating-type DC/DC converter 41B as an example, the AC/DC converter 40 is not limited thereto and may have another circuit configuration.

Although the DC/DC converter 41B is the one-converter circuit using the three-phase DAB as an example, the DC/DC converter 41B is not limited thereto and may be a one-converter circuit using a two-phase DAB or have another circuit configuration.

Although the bidirectional two-phase chopper circuit 50 includes the chopper circuit having the switching elements 51 to 54 and the coupling inductors L3 and L4 as an example, the bidirectional two-phase chopper circuit 50 is not limited thereto and may have another circuit configuration.

Although the high-voltage load unit 3 includes the inverter and the motor generator, as an example, it is not limited thereto and may include other electronic devices.

Although the low-voltage load unit 4 includes the electric air conditioner, as an example, it is not limited thereto and may include other electronic devices.

Although the controller 53 is provided in the power conversion unit 50, as an example, it is not limited to be provided in this manner and may be provided at another place.

The vehicle power supply device according to the present embodiment can use the bidirectional DC/DC converter both as the boosting converter in charging and as the step-down converter in discharging. The device can therefore be substantially prevented from being increased in size.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle power supply device comprising:
a battery that supplies direct-current power to a high-voltage load unit and a low-voltage load unit having a lower voltage than a voltage of the high-voltage load unit;
an alternating-current power supply connector that is configured to be connected to an alternating-current power supply unit supplying alternating-current power to the battery;
an AC/DC converter that converts, into direct-current power, the alternating-current power being supplied to the battery from the alternating-current power supply unit;
a bidirectional DC/DC converter that boosts a voltage of the direct-current power converted by the AC/DC converter to output the direct-current power to the battery and steps down a voltage of the direct-current power being supplied to the low-voltage load unit from the battery;
a first direct-current power supply connector that is configured to be connected to a first direct-current power supply unit supplying a first direct-current power;
a second direct-current power supply connector that is configured to be connected to a second direct-current power supply unit supplying a second direct-current power having a higher voltage than a voltage of the first direct-current power supply unit;
a first electrical path that connects the first direct-current power supply connector to the low-voltage load unit and the bidirectional DC/DC converter in parallel; and
a controller that controls the AC/DC converter and the bidirectional DC/DC converter, wherein when the alternating-current power is supplied from the alternating-current power supply unit, the controller charges the battery with direct-current power converted by the AC/DC converter and boosted by the bidirectional DC/DC converter and supplies, to the low-voltage load unit, the direct-current power converted by the AC/DC converter, when the first direct-current power is supplied from the first direct-current power supply unit to the first electrical path, the controller charges the battery with direct-current power boosted by the bidirectional DC/DC converter and supplies, to the low-voltage load unit, the first direct-current power from the first direct-current power supply unit without passing through the bidirectional DC/DC converter, when the second direct-current power is supplied from the second direct-current power supply unit, the controller charges the battery with the second direct-current power from the second direct-current power supply unit without passing through the bidirectional DC/DC converter and supplies, to the low-voltage load unit, direct-current power of the battery that has been stepped down by the bidirectional DC/DC converter, and when no electric power is supplied from the alternating-current power supply unit, the first direct-current power supply unit, and the second direct-current power supply unit, the controller is capable of supplying direct-current power to the high-voltage load unit from the battery without passing through the bidirectional DC/DC converter and supplies, to the low-voltage load unit, the direct-current power of the battery that has been stepped down by the bidirectional DC/DC converter.

2. The vehicle power supply device according to claim 1, wherein the AC/DC converter includes a rectifying circuit rectifying the alternating-current power supplied from the alternating-current power supply unit into direct-current power and an insulating-type DC/DC converter boosting a voltage of the direct-current power rectified by the rectifying circuit.

3. The vehicle power supply device according to claim 1, wherein the bidirectional DC/DC converter includes a chopper circuit having a switching element allowing conduction of a current or blocking the current and a coil outputting an induction current in accordance with an operation of the switching element.

4. The vehicle power supply device according to claim 2, wherein the bidirectional DC/DC converter includes a chopper circuit having a switching element allowing conduction of a current or blocking the current and a coil outputting an induction current in accordance with an operation of the switching element.

5. The vehicle power supply device according to claim 1, further comprising:

a second electrical path that electrically connects the second direct-current power supply connector to the battery and the bidirectional DC/DC converter in parallel, and connects the bidirectional DC/DC converter and the high-voltage load unit in series.

\* \* \* \* \*